G. SMITH.
WALKING CULTIVATOR.
APPLICATION FILED JUNE 14, 1917.
1,305,674.
Patented June 3, 1919.
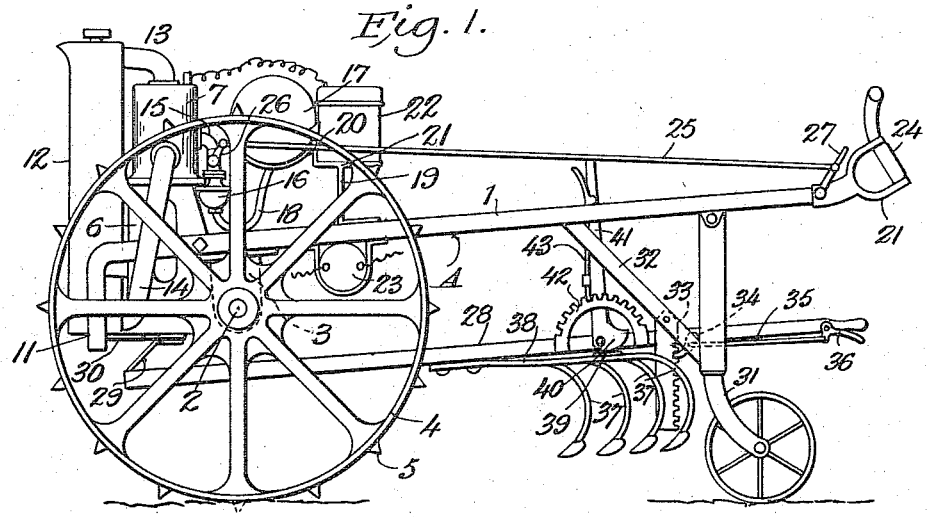
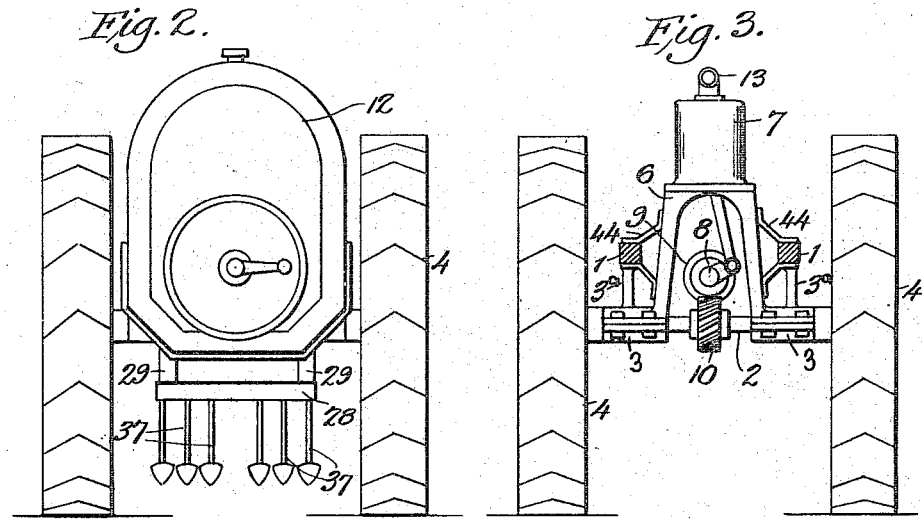
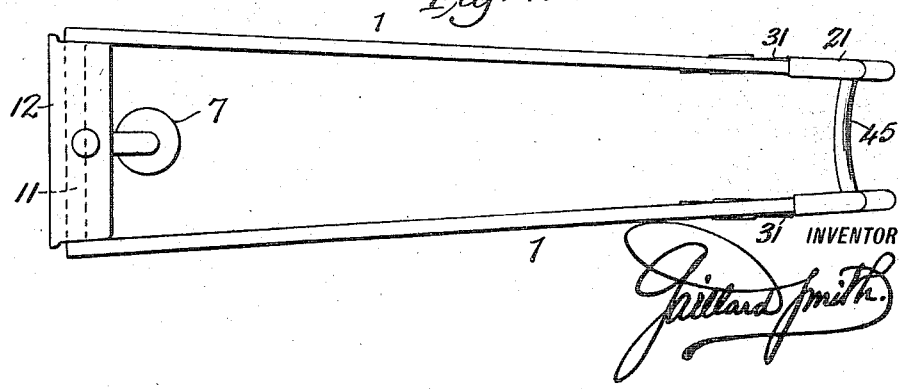
INVENTOR

UNITED STATES PATENT OFFICE.

GAILLARD SMITH, OF GLEN RIDGE, NEW JERSEY, ASSIGNOR TO WORLD HARVESTER CORPORATION, OF NEW YORK, N. Y., A CORPORATION OF DELAWARE.

WALKING-CULTIVATOR.

1,305,674.  Specification of Letters Patent.  Patented June 3, 1919.

Application filed June 14, 1917. Serial No. 174,676.

*To all whom it may concern:*

Be it known that I, GAILLARD SMITH, a citizen of the United States, residing at Glen Ridge, county of Essex, and State of New Jersey, have invented certain new and useful Improvements in Walking-Cultivators, of which the following is a specification.

This invention relates to "walking cultivators", and the general objects of the invention are: first to incorporate propelling mechanism in a cultivator of this type so as to eliminate the use of animals for moving the cultivator over the ground; second to arrange the component parts of the cultivator in a convenient and compact manner and third to mount the cultivator teeth or other cultivating or soil working tool in such a novel manner that they can be inserted, into the ground, to various depths.

Other objects will appear and be better understood from that embodiment of my invention of which the following is a specification, reference being had to the accompanying drawings forming a part hereof, in which, Figure 1 is a side elevation of the improved cultivator.

Fig. 2 is a front view of the cultivator.

Fig. 3 is a detail view showing the manner of mounting the motor on the cultivator.

Fig. 4 is a plan view of the frame of the cultivator.

The cultivator is designated generally by the letter A and comprises a U-shaped frame 1 beneath the forward end of which is located an axle 2 which is journaled in boxes or bearings 3 to which the side bars of the frame 1 are connected by struts 3ª, the said axle being equipped with traction wheels 4 which are peripherally provided with cleats 5 for increasing the purchase of the wheels with the ground. A vertically disposed support, or chair 6 is mounted on the axle 2 by means of bearings 3 and comprises the crank casing of, and supports the cylinder of, an internal combustion motor 7. The crank shaft 8 of the motor 7 is provided with a gear 9 that meshes with a gear 10 carried by the axle 2. It will therefore be seen that upon operation of the motor the axle 2 will be rotated and effect travel of the machine. In the construction shown, the motor shaft extends at right angles to the wheel axle 2 and the gears 9 and 10 are a worm and a worm gear respectively. The forward end of the frame 1 is bent downwardly and forms a supporting yoke 11 for the radiator 12, the said radiator being arranged in communication with the water jacket of the motor or engine 7 by means of an outlet pipe 13 and return pipe 14. The intake pipe for the motor or engine, is designated 15 and is in communication with the carbureter 16, the carbureter being arranged in communication with a fuel supply tank 17, by means of a conducting pipe 18. A bracket 19 is mounted on the frame 1 and is provided with tandem seats 20 and 21. The seat 20 supports the supply tank 17 and a battery box 22 rests on the seat 21. Any suitable ignition system can be employed for igniting a charge drawn into the cylinder of the engine, the type shown in the drawings including batteries incased in the box 22 and adapted to be used primarily for starting, and a magneto 23 that is suspended from the frame 1 and adapted to be closed to the spark plug of the motor, after the engine has been started, by any suitable type of switch to be mounted at a suitable point on the frame 1. The armature of the magneto can be operatively connected with the crank shaft of the engine, in any suitable manner, so as to effect rotation of the armature upon operation of the engine or motor 7. The rear ends of the side of the frame 1 are provided with handles 24 to be gripped by the hands of the operator so as to admit of the cultivator being conveniently steered. A rod 25 extends lengthwise of the frame 1 and has one end connected to a crank 26 carried by the stem of a throttle valve located in the intake pipe 15. The other end of the rod 25 has connection with a lever 27 that is pivoted adjacent one of the handles 24 so as to be in reach of the operator to admit of the convenient operation of the throttle.

A movable platform or carrier 28 is disposed beneath the frame 1 and has the forward end thereof connected to leaf springs 29, the said springs being carried by lateral extending elements 30 that project inwardly from the supporting yoke 11, and forming a swinging connection for the end of the carrier at the front of the machine near the wheel axle. A pair of casters 31 forming a rear running support have the shanks thereof respectively connected to the opposite sides of the frame 1 and diagonal brace rods 32 have connection with the frame 1 and the shanks of the casters 31, only one of those brace rods being shown in the drawings. A vertical rack bar 33 is located on one side of the platform 28 and has one end connected to the brace 32. A pawl 34 is carried by the platform 28 and is adapted to interchangeably engage in the notches defined by the teeth on the rack 33 so as to coöperate with the rack in holding the platform at selected positions. An operating rod 35 has one end connected to the pawl 34 so as to admit of the latter being moved into or out of engagement with the rack, the other end of the operating rod being connected to a handle 36 carried by the rear end of the platform 28. A plurality of cultivator teeth 37 is carried by the platform 28 and each has an upper horizontally extending portion 38 the free end of which has connection with the platform. The parts 38 are formed of relatively springy metal so as to render the teeth depressible. A strip 39 extends across the horizontal portion of the teeth and is secured thereto and has one end projecting a distance beyond one side of the platform. This extended end of the strip is adapted to be engaged by a cam shaped head 40 formed on the lower end of a lever 41 which is pivoted to the platform 28. When the lever 41 is moved rearwardly the head 40 will exert a downward pressure on the strip 39 and effect depression or downward movement of the teeth 37, the degree of depression of the teeth being determined by the distance the lever 41 is moved. A segmental rack 42 is mounted on the platform 28 and a locking rod 43 is carried by the lever 41 and is adapted to be interchangeably received by the notches defined by the teeth on the rack 42 so as to permit the lever being held at selected positions. By virtue of the provision of depressible teeth, the same can be set to engage in the ground, at various depths; also by reason of the fact that the teeth are carried by a movable platform the teeth can be conveniently raised from engagement with the ground when it is desired to turn the cultivator around or to raise the teeth above any surface obstruction.

Suitable brace rods 44 have connection with the frame 1 and the upright 6 and a U shaped bar 45 extends transversely across the rear end of the frame and has connection with the handles 24. The bar 45 admits of the operator exerting the required amount of pressure on the rear end of the frame 1 so as to prevent the combined weight of the engine and radiator, on the forward end of the frame, from tilting the cultivator forwardly during the operation of the latter.

It is evident that various changes might be resorted to in the form, construction and arrangement of the several parts without departing from the spirit and scope of the invention as claimed.

What is claimed as new is:

1. A walking cultivator, comprising a pair of carrying wheels, an axle on which said wheels are mounted, a supporting structure mounted on said axle between the carrying wheels and adapted to carry suitable wheel-driving means, a rearwardly extending frame, a rear running support carried by said frame, a vertically adjustable carrier hung beneath said frame for carrying soil working means between the carrying wheels and said rear running support, and a spring connection between the forward end of said carrier and the forward portion of the rearwardly extending frame.

2. A walking cultivator, comprising a pair of carrying wheels, an axle on which said wheels are mounted, a supporting structure mounted on said axle between the carrying wheels and adapted to carry suitable wheel-driving means, a rearwardly extending handle frame, a yoke forward of the axle connected to and extending between the arms of said frame and forming a support for a portion of said wheel driving means, a rear running support carried by said frame, a tool carrier having a swinging connection to said yoke and extending rearwardly therefrom, and means adjacent the handles of the frame for raising and lowering said carrier.

3. A walking cultivator, comprising a pair of carrying wheels and an axle therefor, a frame comprising side bars extending rearwardly and provided with operating handles at their rear ends and having their front ends bent downwardly and connected by a cross piece forming a yoke forward of the axle and adapted to carry suitable wheel driving means, a wheeled trailer connected to the rear of said frame, a spring carried by the yoke, and an agricultural implement connected to said spring and active between the axle and the trailer.

4. A machine of the character described, comprising carrying wheels, an axle connected to said wheels, an upwardly extending chair adapted to carry suitable wheel-driving means and having bearings embracing the axle, a handle-bar frame connected both to the chair and to said bearings, and having a forward extension, a yoke extending between the arms of said forward extension, a wheeled trailer connected to the rear of said handle-bar frame, an underslung bearing, a spring connecting said bearing to said yoke, an agricultural tool connected to said underslung bearing and interposed between said bearing and trailer, and vertically adjustable connections between said frame and agricultural tool.

In testimony whereof, I have signed my name to this specification, this twelfth day of June, 1917.

GAILLARD SMITH.

Witnesses:
A. E. MORLEY,
J. WM. COLLINS.